May 17, 1932.

W. F. ROGERS
STOVE

Original Filed Jan. 17, 1930

Re. 18,465

Witness.
Kenneth Anderson,

Inventor
Walter F. Rogers,
By Rumble & Rumble,
Attys.

Reissued May 17, 1932

Re. 18,465

UNITED STATES PATENT OFFICE

WALTER F. ROGERS, OF OAK PARK, ILLINOIS, ASSIGNOR TO CROWN STOVE WORKS, OF CICERO, ILLINOIS, A CORPORATION OF ILLINOIS

STOVE

Original No. 1,773,754, dated August 26, 1930, Serial No. 421,527, filed January 17, 1930. Application for reissue filed March 3, 1932. Serial No. 596,663.

The main objects of this invention are to provide a stove having an improved form of guard for shielding the burner control means so as to prevent any accidental manipulation thereof; to provide a hinged guard which will conceal the burner control means and present the appearance of an oven door when the burners are not in use; to provide a hinged guard of this type which is adapted to form a protecting ledge projecting forwardly from the stove to prevent the body or clothes of the operator from accidentally contacting with the hot cooking top when the burners are in use; to provide improved means for obstructing the closing of the guard while any one of the burner control means is open; and to provide a stove of this type wherein the operating parts may be easily accessible.

An illustrative embodiment of this invention is shown in the accompanying drawings, wherein.

Figure 1:
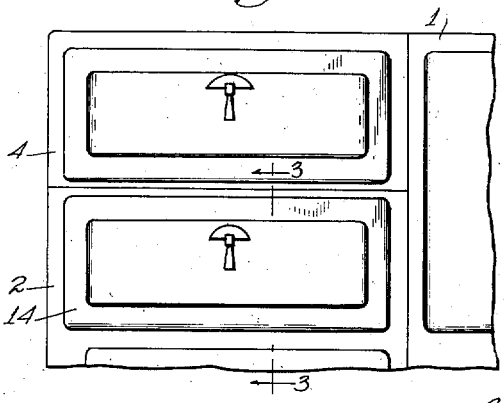
Figure 1 is a fragmentary front elevation of an improved gas stove showing the hinged guard in closed position.
Figure 2:
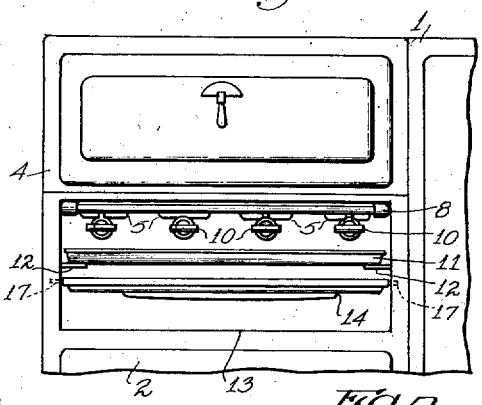
Fig. 2 is a similar view, but showing the guard in open position.
Figure 3:
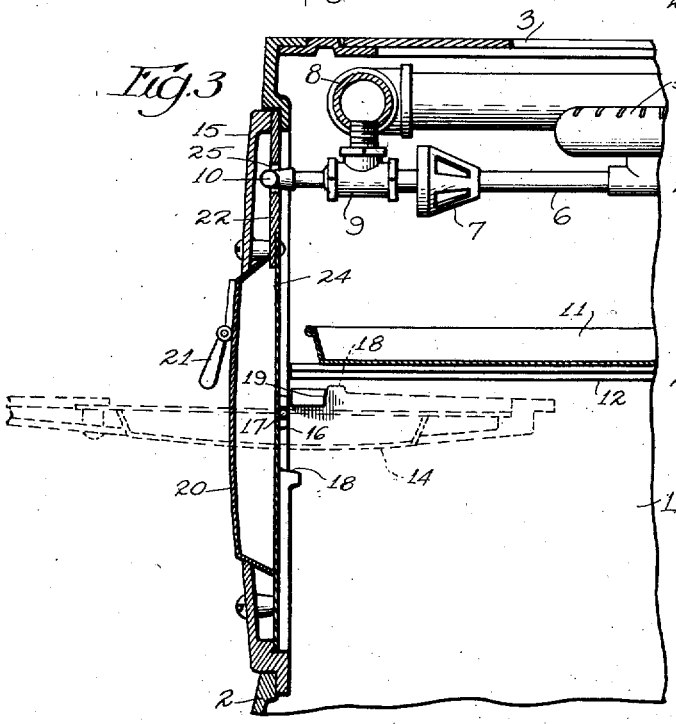
Fig. 3 is an enlarged vertical section, taken on the line 3—3 of Fig. 1, the dotted outline representing the door in open position.
Figure 4:
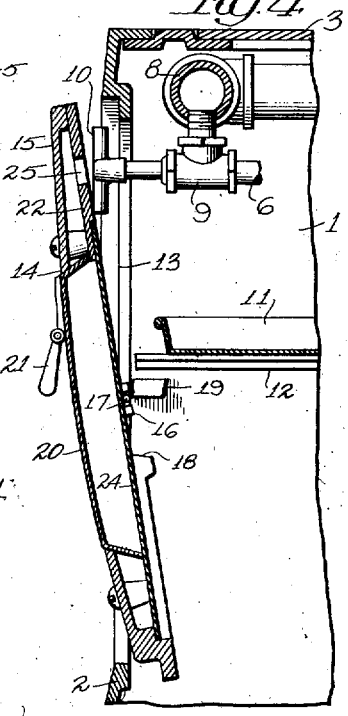
Fig. 4 is a view similar to Fig. 3 but showing one of the valves in open position and the guard partly closed.
Figure 5:
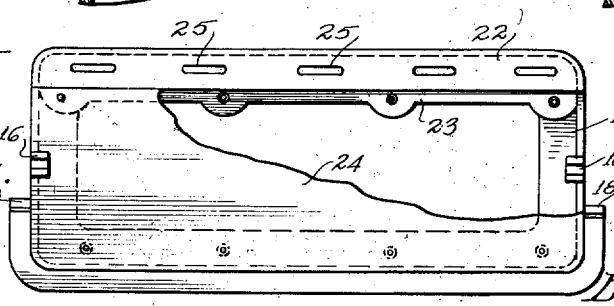
Fig. 5 is an elevation of the rear side of the guard, part of the lining being broken away.

In both gas and electric stoves, it is desirable to conceal the burner control means when the stove is not in use. This may be done by means of a door or panel movably mounted directly in front of the valves or burner switches. Such a door enhances the appearance of the stove and also deters children of tender years from playing with the burner control means.

When such a door is used, the housekeeper may want to close the door during the operation of the stove. If this is done on a gas stove serious results may ensue. If the door is closed, its cuts off the secondary air supply to the gas burners and may cause the flames to be smothered. Moreover, in both gas and electric stoves, there should be ample fresh air at the valves or switches to prevent them from becoming overheated. If they are overheated by the burners, they may become inoperative.

In both gas and electric stoves, it is also very desirable to have some form of a signal which will enable the housekeeper to tell at a glance when any one of the burner control means is in operation.

For these reasons I contemplate arranging the burner control means and their door in such manner that, when any one of the burner control means is in open position, it forms a stop for obstructing the closing of the door.

This invention may be applied to gas and electric stoves but, in the accompanying drawings, I have illustrated the invention in connection with a gas stove.

In the specific construction shown, the gas stove to which this invention is applied comprises a frame 1 having a front wall 2, and a burner top 3. Hinged to the rear wall of the stove, is a hood 4, which is adapted to occupy a horizontal position for concealing the burner top when the stove is not in use and which is adapted to occupy a vertical position to provide a splash plate when the stove is in use.

Inasmuch as this invention relates primarily to the movable guard for the valve handles, certain portions of the stove not relating thereto and believed unnecessary to a thorough understanding of the invention have been omitted from the drawings.

Supported below the top 3, are burners 5, of any suitable construction, having forwardly extending conduits 6 provided with mixing chambers 7. Extending across the front part of the stove, is the usual manifold 8 for supplying fuel to the burners. Located between the manifold and the mixing chambers, are valves 9 having handles 10 for controlling the supply of fuel.

In the form shown, the handles 10 are rotatable on horizontal axes and they are arranged so that, when the valves are closed, the handles are disposed horizontally in alinement with one another. When the valves are fully open, the handles are disposed vertically.

Located below the burners, is a drip pan 11 which is slidably supported on racks 12 secured to the frame structure.

Formed in the front wall of the stove, directly in front of the valves and drip pan, is an opening 13 into which the valve handles project, and in which is mounted an improved hinged door 14 which, when closed, conceals the manifold and valves and is disposed substantially flush with the front wall. The axis of the door 14 is horizontal and is preferably spaced from the upper and lower edges of the door so that, when the door is opened, the upper edge swings outwardly and the lower edge swings inwardly to a position underneath the drip pan.

The door 14 herein shown comprises a cast metal frame 15 having trunnions 16 integrally formed on the sides thereof for engagement with hinge pins 17 mounted on the front wall 2. Formed adjacent the trunnions 16, are lugs 18 adapted to engage shoulders 19 on the inner side of the front wall 2 for limiting the opening movement of the door. The front of the door is faced with a plate 20 to which a handle 21 is secured.

Mounted on the back of the door, is a guard or plate 22 having a flange 23 to which a lining 24 may be secured. The plate 22 is spaced from the front plate 20.

Formed in the plate 22, are slots 25 corresponding in number to the valve handles 10. These slots form sockets of sufficient size to accommodate the valve handles 10 when the door 14 and all the valves are closed. However, when any one of the valves 9 is open, its handle 10 is turned upwardly so that, if the door 14 is swung upwardly the open valve handle will span the corresponding socket 25 so as to form a stop for obstructing the closing of the door.

It will thus be apparent that during the operation of any one of the burners, its controlling valve handle obstructs the closing of the door 14 and thereby insures a proper supply of primary and secondary air for the burner which will prevent smothering of the flame. The door 14 therefore serves also as a signal to indicate whether a valve is open.

When the door 14 is open it serves as a protecting ledge to prevent the body or clothes of the operator from coming into accidental contact with the hot burner top.

When the improved door 14 is closed, it enhances the beauty of the stove because it conceals the operating parts and it also serves as a safety guard to prevent access to the valves by small children.

Although but one specific embodiment of this invention has been herein shown and described, it will be understood that specific details of the construction may be altered or omitted without departing from the spirit of this invention as defined by the following claims.

I claim:

1. A gas stove comprising a burner, a front wall having an opening therein, a valve controlling the supply of fuel to said burner, a rotatable handle located in horizontal alinement with said opening for operating said valve, and a hinged door movable into and out of position for closing said opening, said door having a socket therein adapted to accommodate said valve handle when said door and handle are both in closed positions, said handle when open being adapted to span said socket to obstruct the closing of said door.

2. A gas stove comprising a burner, a front wall having an opening therein, a valve controlling the supply of fuel to said burner, a rotatable handle located in horizontal alinement with said opening for operating said valve, a hinged door movable into and out of position for closing said opening, and a plate mounted on the inner side of said door, said plate having a socket adapted to accommodate said valve handle when said door and handle are both in closed positions, said handle when open being adapted to span said socket and to engage said plate for obstructing the closing of said door.

3. A gas stove comprising a substantially vertical front wall having an opening therein, a burner, a valve handle controlling the supply of fuel to said burner, a drip pan located below said burner, said handle and pan being located in horizontal alinement with said opening, a hinged door mounted in said opening on a horizontal axis spaced from the upper and lower edges of said door in a horizontal plane below said pan, the upper edge of said door being swingable outwardly, the lower edge of said door being swingable inwardly from said front wall so as to be disposed below said drip pan, and stops on said door and front wall adapted to coact when said door occupies a horizontal position.

4. A gas stove comprising a vertical front wall having an opening therein, burners, a gas manifold disposed substantially parallel to said front wall, a plurality of valves on said manifold for controlling the supply of fuel to said burners, handles for operating said valves, and a hinged door mounted in said opening, said door having a plurality of sockets spaced apart horizontally for accommodating said valve handles when said door and all of said handles are in closed positions, any one of said handles when open being adapted to span the corresponding socket to obstruct the closing of said door.

5. A stove comprising a frame having a burner top, a burner, burner control means, and a vertical exposed wall having a panel section normally concealing said burner control means and being movable outwardly from said wall and below the plane of said burner top to permit access to said control means, said control means being adapted when open to obstruct the closing of said panel section.

6. A stove comprising a frame having a burner top and a vertical exposed wall, a burner, and burner control means having a handle rotatable on an axis disposed at substantially right angles to said wall, said wall having a panel section normally concealing said handle and being movable outwardly from said wall and below the plane of said burner top to permit access to said handle, said handle being adapted when in open position to obstruct the closing of said panel section.

WALTER F. ROGERS.